(12) United States Patent
Kuniya

(10) Patent No.: US 12,459,578 B2
(45) Date of Patent: Nov. 4, 2025

(54) VEHICLE FRONT STRUCTURE

(71) Applicant: TOYOTA JIDOSHA KABUSHIKI KAISHA, Toyota (JP)

(72) Inventor: Takeshi Kuniya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 306 days.

(21) Appl. No.: 18/123,408

(22) Filed: Mar. 20, 2023

(65) Prior Publication Data

US 2023/0303184 A1    Sep. 28, 2023

(30) Foreign Application Priority Data

Mar. 22, 2022    (JP) .................................. 2022-045835

(51) Int. Cl.
 B62D 25/08    (2006.01)
 B60K 5/12    (2006.01)

(52) U.S. Cl.
 CPC .......... B62D 25/085 (2013.01); B60K 5/1208 (2013.01)

(58) Field of Classification Search
 CPC .. B62D 25/085; B60K 5/1208; B60K 5/1216; B60K 5/1241
 See application file for complete search history.

(56) References Cited

U.S. PATENT DOCUMENTS

| 2005/0254888 | A1* | 11/2005 | Oji ........................ | F16F 1/3849 403/187 |
| 2013/0241186 | A1* | 9/2013 | Shibaya ................ | B62D 21/00 280/781 |
| 2014/0311812 | A1 | 10/2014 | Kambayashi | |
| 2015/0300446 | A1* | 10/2015 | Shimada ............... | F16F 1/3873 267/140.4 |
| 2016/0068189 | A1* | 3/2016 | Imanishi .................. | B22C 9/10 296/204 |
| 2016/0152270 | A1* | 6/2016 | Kondo .................... | B62D 21/00 280/124.109 |
| 2016/0193907 | A1* | 7/2016 | Satou .................. | B60K 5/1208 267/140.4 |
| 2019/0118863 | A1* | 4/2019 | Hara ...................... | B62D 25/20 |
| 2019/0315218 | A1* | 10/2019 | Kawahara ............ | B60K 5/1241 |
| 2020/0307697 | A1* | 10/2020 | Takahashi .............. | B62D 21/11 |
| 2022/0306201 | A1* | 9/2022 | Ito ........................ | B62D 29/008 |
| 2022/0306202 | A1* | 9/2022 | Ito ........................ | B62D 29/008 |
| 2022/0306203 | A1* | 9/2022 | Ito ........................ | B62D 21/11 |
| 2022/0306205 | A1* | 9/2022 | Ito .......................... | B62D 3/126 |

FOREIGN PATENT DOCUMENTS

| JP | 2010-280237 A | 12/2010 |
| JP | 2013-095152 A | 5/2013 |
| JP | 5419264 B2 | 2/2014 |

\* cited by examiner

*Primary Examiner* — Brian L Swenson
(74) *Attorney, Agent, or Firm* — Dinsmore & Shohl LLP

(57) ABSTRACT

A torque rod connects a drive unit and a suspension member. The suspension member has a hollow structure and having a front wall opening formed in a front wall. A rear end of the torque rod is coupled to the suspension member in an interior space of the suspension member, and a front end of the torque rod is coupled to the drive unit via a bracket. A gap between the front wall opening and an opening-corresponding portion of the torque rod that corresponds to the front wall opening is 3 mm or less on a left side and/or a right side of the opening-corresponding portion.

6 Claims, 4 Drawing Sheets

VEHICLE FRONT STRUCTURE

CROSS REFERENCE TO RELATED APPLICATION

This application claims priority to Japanese Patent Application No. 2022-045835, filed on Mar. 22, 2022, which is incorporated herein by reference in its entirety including the specification, claims, drawings, and abstract.

TECHNICAL FIELD

The present disclosure relates to a vehicle front structure, and in particular to the structure in a motor compartment that houses a motor.

BACKGROUND ART

A drive unit for vehicle drives including a motor such as an engine is supported by a vehicle body by a mount and is housed in the motor compartment. To restrain swaying of the drive unit supported by the mount, a torque rod may be employed to connect the drive unit to the vehicle body. JP2010-280237 A discloses a torque rod (37) connecting a drive system (drive unit 21) and a suspension member (14). The suspension member (14) has a hollow structure, and the torque rod (37) has one end connected to the suspension member (14) in the interior space of the suspension member (14). In addition, the torque rod (37) extends through an opening (31) formed in a front plate (25) of the suspension member (14) and has the other end coupled to the drive unit (21). The names and reference numerals of the members in parentheses above are those used in JP2010-280237 A and are not related to those used in the description of the embodiment of the present application.

SUMMARY

In consideration of an offset crash and a small overlap crash of a vehicle, it may be desirable to keep the drive unit in the motor compartment to restrain deformation of the front part of the vehicle body.

The present disclosure provides a vehicle front structure that restrains lateral displacement of the drive unit in an offset crash and a small overlap crash.

A vehicle front structure according to the present disclosure includes a suspension member having a hollow structure and disposed at a rear lower part of a motor compartment, with movable parts of a suspension being coupled to the suspension member, and a torque rod connecting the suspension member and a drive unit located in front of the suspension member. The torque rod has a first end coupled to the suspension member, a second end coupled to the drive unit, and a rod portion connecting the first end and the second end. An opening is formed in a front wall of the suspension member facing the drive unit to allow the rod portion of the torque rod to pass through the opening, and the first end of the torque rod is coupled to the suspension member in an interior space of the suspension member. A gap between the opening in the front wall of the suspension member and an opening-corresponding portion of the rod portion that corresponds to the opening of the suspension member is 3 mm or less on a right side and/or a left side of the opening-corresponding portion.

The edge of the opening in the front wall of the suspension member restrains the movement of the torque rod and the displacement of the drive unit.

In the vehicle front structure described above, a lateral dimension of the torque rod may be longest at the opening-corresponding portion. In addition, the lateral dimension of the opening-corresponding portion of the torque rod may be equal to or longer than the left-right dimension of the first end.

In the vehicle front structure described above, the torque rod is solid and made of an aluminum alloy, with its cross-sectional shape at the opening-corresponding portion having a lateral dimension longer than a vertical dimension.

Limiting the movement of the torque rod in an offset crash or small overlap crash of the vehicle can restrain the displacement of the drive unit coupled to the torque rod.

DESCRIPTION OF EMBODIMENTS

An embodiment of the present disclosure will be described below with reference to the accompanying drawings. Hereinafter, the terms indicating positions, directions, and orientations, such as front, forward, rear, rearward, left, leftward, right, rightward, up, upward, down, downward, and the like denote relative positions, directions, and orientations with respect to the vehicle, unless otherwise specified. In addition, the front-rear direction of the vehicle is referred to as the longitudinal direction, the left-right direction as the lateral direction, and the up-down direction as the vertical direction. In each drawing, an arrow FR points forward, an arrow UP points upward, an arrow LH points leftward, and an arrow OUT points outward in the vehicle width direction.

Figure 1:
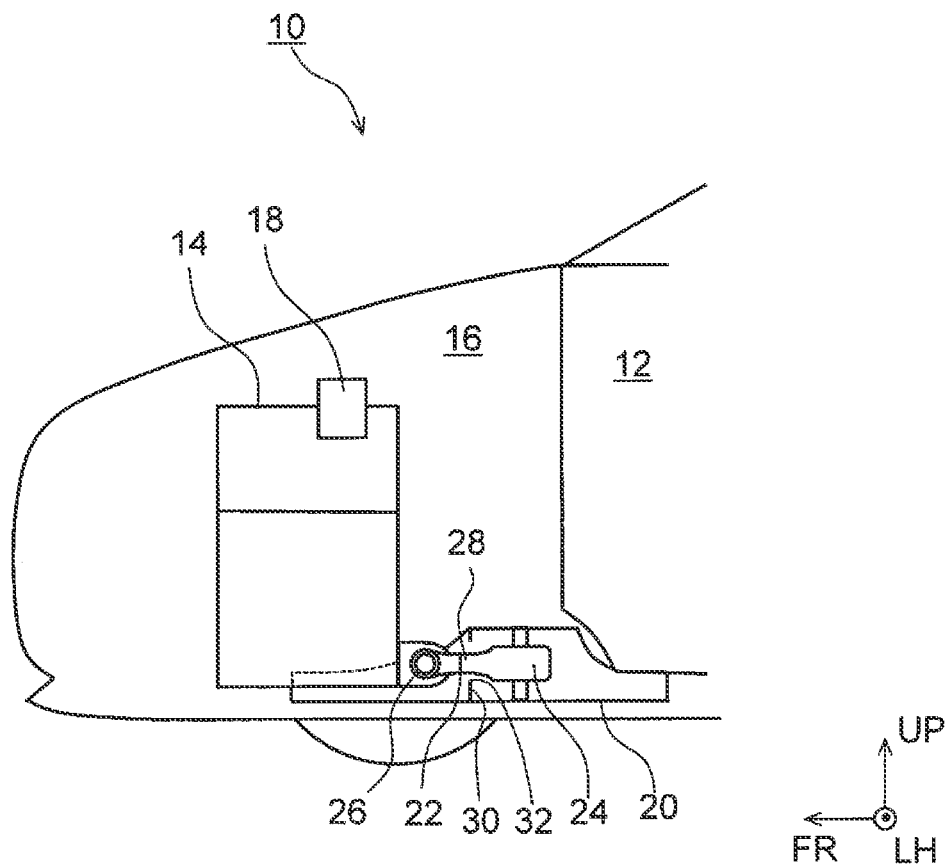
FIG. 1 is a schematic side view of a vehicle front structure.

FIG. 1 schematically illustrates the front structure of a vehicle 10. A motor compartment 16 housing a drive unit 14 including a motor is provided in front of a passenger compartment 12. The drive unit 14 includes an engine as a motor and a transmission that reduces the output of the engine. The drive unit 14 may include a hybrid motor combining an engine and an electric motor, or may include only an electric motor as the motor. The output of the motor is transmitted to drive wheels to drive the vehicle 10. The drive unit 14 is suspended and supported by two mounts 18 fixed to the vehicle body at two points on the left and right sides.

A suspension member 20 is provided below the motor compartment 16 and behind the drive unit 14 and is fixed to the vehicle body. Movable parts of the suspension, such as suspension arms (not illustrated), are coupled to the suspension member 20. In addition, a torque rod 22 connecting the drive unit 14 and the suspension member 20 is provided between the drive unit 14 and the suspension member 20. A rear end (first end) 24 of the torque rod 22 is coupled to the suspension member 20, and a front end (second end) 26 is coupled to the drive unit 14. The torque rod 22 also has a rod portion 28 connecting the rear end 24 and the front end 26.

The suspension member 20 has a hollow structure and has a front wall opening 32 formed in a front wall 30 facing the drive unit 14. The rear end 24 of the torque rod 22 is coupled to the suspension member 20 in the interior space of the suspension member 20. The rod portion 28 extends forward from the rear end 24 and passes through the front wall opening 32 to reach the front end 26 coupled to the drive unit 14. The torque rod 22 restrains swaying of the drive unit 14, which is suspended and supported by the two mounts 18, around axes extending through the two mounts 18.

Figure 2:
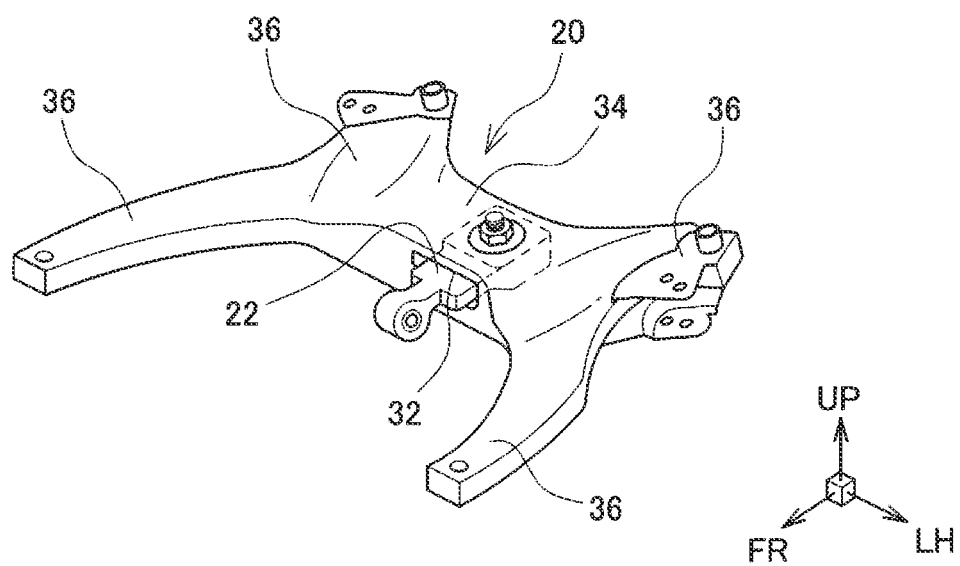
FIG. 2 is a perspective view illustrating a suspension member and a torque rod.
Figure 3:
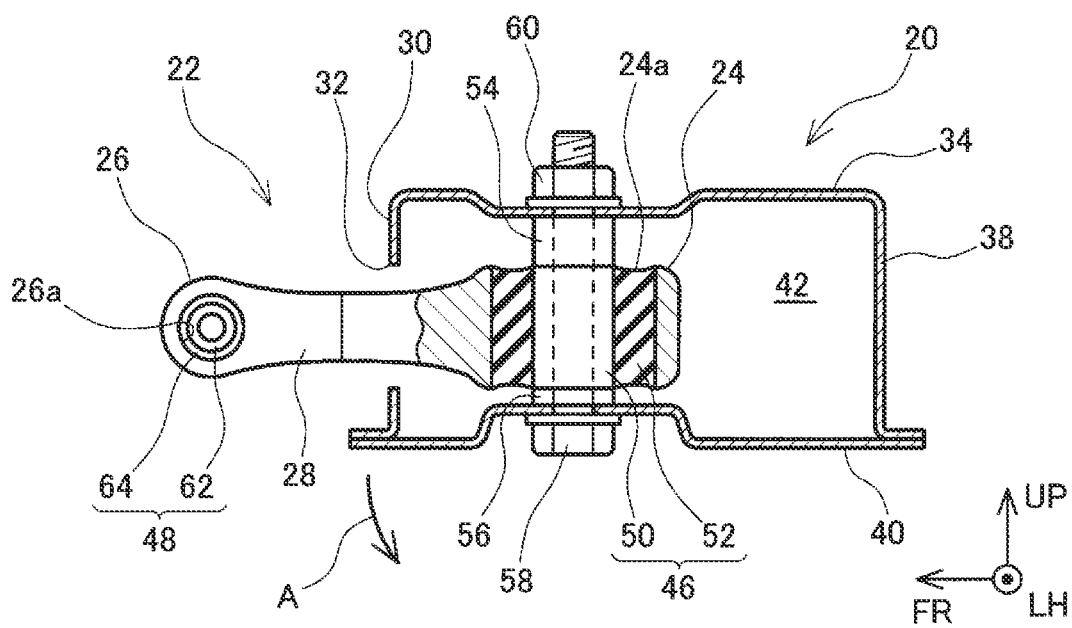
FIG. 3 is a cross-sectional side view of a part of the suspension member and the torque rod.
Figure 4:
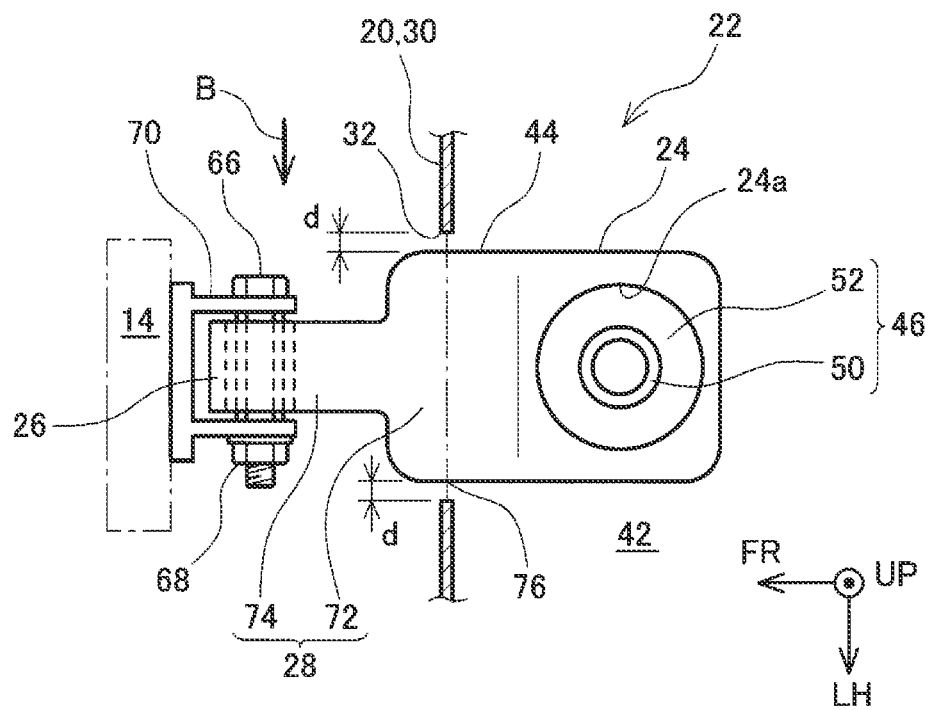
FIG. 4 is a plan view illustrating the torque rod and its surrounding structure.
Figure 5:
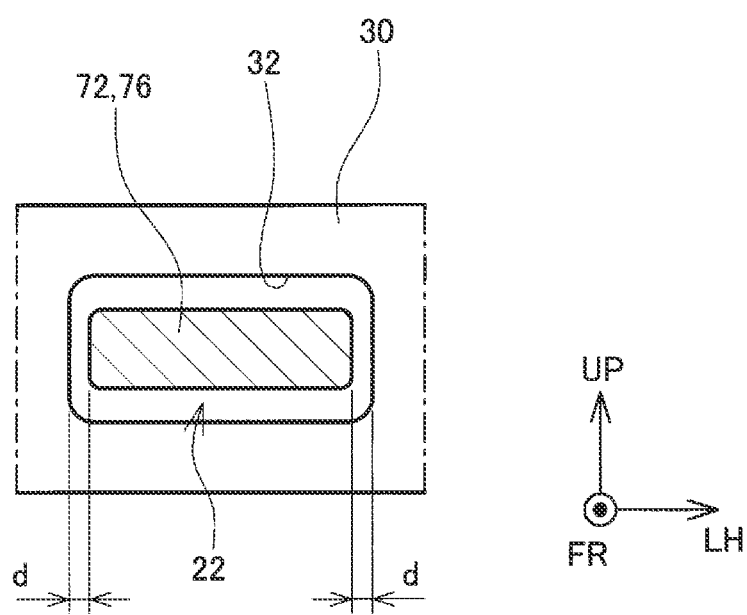
FIG. 5 is a view illustrating the relationship between an opening in the front wall of the suspension member and the torque rod.

FIGS. 2 to 5 schematically illustrate the suspension member 20 and the torque rod 22, in which FIG. 2 is a perspective view, FIGS. 3 and 4 are a side view and a plan view, respectively, of the suspension member 20 and the torque rod 22 when they are broken as appropriate, and FIG. 5 illustrates the relationship between the front wall opening 32 in the front wall 30 of the suspension member 20 and the torque rod 22.

The suspension member 20 has a center portion 34 and four arms 36 extending from the center portion 34 toward the front left, front right, rear left, and rear right directions. The suspension member 20 is formed into a hollow structure by joining an upper member 38 and a lower member 40, which are made of a press-formed sheet metal, by welding or other techniques. The rear end 24 of the torque rod 22 is located in the interior space 42 of the center portion 34. The front wall opening 32 is formed in the front wall 30 of the center portion 34 of the suspension member 20, and the rod portion 28 extending forward from the rear end 24 of the torque rod 22 passes through this front wall opening 32.

The torque rod 22 is solid and made of an aluminum alloy. Specifically, the torque rod 22 includes a solid body 44 made of an aluminum alloy, and a rear end coupling structure 46 and a front end coupling structure 48 provided at the rear end 24 and the front end 26, respectively. The rear end coupling structure 46 includes a cylindrical bushing 50 disposed in the center portion of an opening 24a formed in the body 44 at the rear end 24, and an elastic body 52, such as a rubber body, disposed between the bushing 50 and the body 44 to couple them together. The bushing 50 is disposed with its centerline extending substantially in the vertical direction. A bolt 58 penetrates through the bushing 50 and spacers 54, 56 coupled to the suspension member 20 and is tightened with a nut 60, which is threaded on the bolt 58, to secure the bushing 50 to the suspension member 20.

Like the rear end coupling structure 46, the front end coupling structure 48 also includes a cylindrical bushing 62 disposed in the center portion of an opening 26a formed in the body 44 at the front end 26, and an elastic body 64, such as a rubber body, disposed between the bushing 62 and the body 44 to couple them together. The bushing 62 is positioned with its centerline extending substantially in the lateral direction. A bolt 66 penetrates through the bushing 62 and is tightened with a nut 68, which is threaded on the bolt 66, to secure the bushing 62 to a bracket 70 fixed on the drive unit 14.

The lateral dimension of the torque rod 22 is longer at the rear end 24 than at the front end 26. The rod portion 28 includes a wide portion 72 having a lateral dimension equal to the rear end 24 and a narrow portion 74 having a lateral dimension equal to the front end 26. The lateral dimension is constant throughout the wide portion 72 from the rear end 24 and is also constant throughout the narrow portion 74 to the front end 26. As well illustrated in FIG. 4, an opening-corresponding portion 76 of the torque rod 22, which corresponds to the front wall opening 32 of the suspension member 20, is located in the wide portion 72. The lateral dimension is longest at the opening-corresponding portion 76, as well as at the rear end 24, of the torque rod 22.

The opening-corresponding portion 76, or the wide portion 72 of the rod portion 28, has a rectangular shape having longer sides in the lateral direction and may have an aspect ratio of at least 2 or at least 3. A gap d in the lateral direction between the front wall opening 32 and the opening-corresponding portion 76 is 3 mm or less. The dimensions of the front wall opening 32 needs to be large enough to allow the rear end 24 to pass through during assembly.

In the frontal collision of the vehicle 10, the suspension member 20 moves so that the front side thereof is lowered (see arrow A in FIG. 3), and the upper edge of the front wall opening 32 comes to contact the opening-corresponding portion 76 of the torque rod 22. Because of the short vertical dimension of the opening-corresponding portion 76 and because the aluminum alloy easily fractures, the torque rod 22 tends to break at the opening-corresponding portion 76. The torque rod 22 also easily breaks because it is solid. If the torque rod 22 is hollow, it would be deformed and bent as its cross-sectional shape collapses, but may not break. When broken, the torque rod 22 tends to cause downward movement of the drive unit 14 and prevents it from entering the passenger compartment 12. On the other hand, in the offset crash or small overlap crash, the torque rod 22 receives forces from the lateral direction, as indicated by arrow B in FIG. 4, and rotates about the rear end 24 so that the opening-corresponding portion 76 comes to contact the side edge of the front wall opening 32. Because of the long lateral dimension of the opening-corresponding portion 76, the torque rod 22 does not break and the lateral displacement of the drive unit 14 is restrained. Thus, the load of collision is partially transmitted through the drive unit 14 to the side opposite to the collision side to distribute the load, and the distributed load restrains the deformation of the front of the vehicle body.

When the lateral load is applied to the torque rod 22, it is desirable to decrease the rotation of the torque rod 22 to restrain the displacement of the drive unit 14. For this purpose, the gap d between the front wall opening 32 and the opening-corresponding portion 76 is made smaller. Since the rear end 24 needs to be passed through the front wall opening 32 during assembly, the front wall opening 32 should be large enough to allow the rear end 24 of the torque rod 22 to pass through. Thus, the opening-corresponding portion 76 needs to be enlarged to reduce the gap d. In the present embodiment, the gap d is reduced by making the lateral dimension of the opening-corresponding portion 76 equal to that of the rear end 24. In a case in which the front wall opening 32 is larger than the dimensions of the rear end 24, the opening-corresponding portion 76 may have a lateral dimension longer than the lateral dimension of the rear end 24. The lateral dimension of the opening-corresponding portion 76 can be longest at a part of the torque rod 22 that is inserted into the interior space 42.

To minimize the opening through which the torque rod 22 passes to be smaller than the rear end 24 of the torque rod 22, a patch may be applied to the front wall 30 to cover a portion of the front wall opening 32, after the torque rod 22 is inserted through the opening, to narrow the opening and the gap d. In a case in which the front of the vehicle body is asymmetrical; that is, for example, the skeletal structure and the shape of the drive unit 14 are asymmetrical, or the torque rod 22 is arranged asymmetrically, the direction of restraining the displacement of the drive unit 14 may be limited to either the left or right direction. In that case, the rotation of the torque rod 22 is also restrained only on one side. Thus, of the gaps d on the left and right sides of the opening-corresponding portion 76, only the gap d on the side on which the rotation of the torque rod 22 needs to be restrained may be 3 mm or less. The shape of the opening-corresponding portion 76 may not be a rectangular shape, and may be, for example, a laterally long elliptical shape, an oval shape, or an overturned I-shape.

REFERENCE SIGNS LIST

10 Vehicle
14 Drive unit
16 Motor compartment
20 Suspension member
22 Torque rod
24 Rear end (first end) of torque rod
26 Front end (second end) of torque rod
28 Rod portion of torque rod
30 Front wall of suspension member
32 Front wall opening (opening)
42 Interior space of suspension member
50, 62 Bushing
52, 64 Elastic body
54, 56 Spacer
72 Wide portion of rod portion
74 Narrow portion of rod portion
76 Opening-corresponding portion

The invention claimed is:

1. A vehicle front structure according, comprising:
a suspension member having a hollow structure and disposed at a rear lower part of a motor compartment, with movable parts of a suspension being coupled to the suspension member; and
a torque rod connecting the suspension member and a drive unit located in front of the suspension member, the torque rod having a first end coupled to the suspension member, a second end coupled to the drive unit, and a rod portion connecting the first end and the second end, wherein
an opening is formed in a front wall of the suspension member facing the drive unit to allow the rod portion of the torque rod to pass through, and the first end of the torque rod is coupled to the suspension member in an interior space of the suspension member, and
a gap between the opening and an opening-corresponding portion of the rod portion that corresponds to the opening of the suspension member is 3 mm or less on a left side and/or a right side of the opening-corresponding portion.

2. The vehicle front structure according to claim 1, wherein
a lateral dimension of the torque rod is longest at the opening-corresponding portion.

3. The vehicle front structure according to claim 1, wherein
a lateral dimension of the opening-corresponding portion of the torque rod is equal to or longer than a lateral dimension of the first end.

4. The vehicle front structure according to claim 2, wherein
the torque rod is solid and made of an aluminum alloy, with a cross-sectional shape having a lateral dimension at the opening-corresponding portion longer than a vertical dimension.

5. The vehicle front structure according to claim 3, wherein
the torque rod is solid and is made of an aluminum alloy, with a cross-sectional shape having a lateral dimension at the opening-corresponding portion longer than a vertical dimension.

6. The vehicle front structure according to claim 1, wherein
a lateral dimension of the torque rod is constant from forward of the opening to the second end of the torque rod.

* * * * *